Oct. 11, 1960   O. H. HANSEN   2,955,291
METHOD OF FASTENING WOOD OR LIKE MEMBERS TOGETHER
Filed May 7, 1959

INVENTOR.
OLIVER H. HANSEN
BY
ATTORNEYS

United States Patent Office 2,955,291
Patented Oct. 11, 1960

2,955,291

METHOD OF FASTENING WOOD OR LIKE MEMBERS TOGETHER

Oliver H. Hansen, % Research to Reality, Detroit 26, Mich.

Filed May 7, 1959, Ser. No. 811,731

2 Claims. (Cl. 1—60)

Effective nailing or screw fastening together of relatively soft materials such as pressed fiber boards is difficult because of the tendency of the nails or screws to pull out of the boards with relatively little resistance. End grain nailing of wood is frequently unsatisfactory for the same reason. The problem is aggravated where the members are relatively thin so that thin nails or screws having little frictional purchase or joining strength must be used.

The object of this invention is to provide a simple, improved, inexpensive means and method of effectively securing such members together.

The invention is carried out generally by driving an imperforate anchor plate into one of the members and after the members have been abutted, driving a nail or self-threading screw into the members so that in a single operation it pierces through the first member, pierces and penetrates the second member and pierces through the imperforate plate. No drilling or piercing of the members or the plate is necessary prior to driving the fastening device home. One form of the invention is illustrated in the accompanying drawings.

Figure 1:
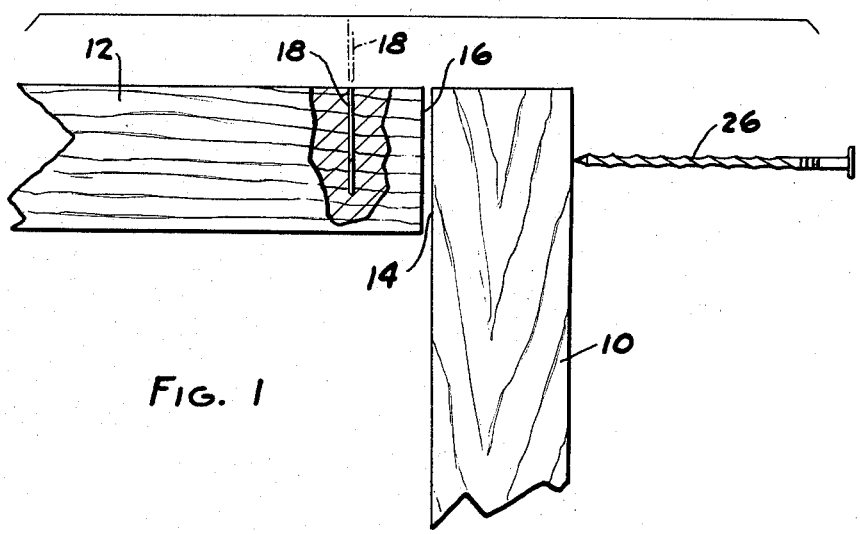
Fig. 1 is a generally elevational view of two members and the fastening means prior to driving the fastening means home.
Figure 2:
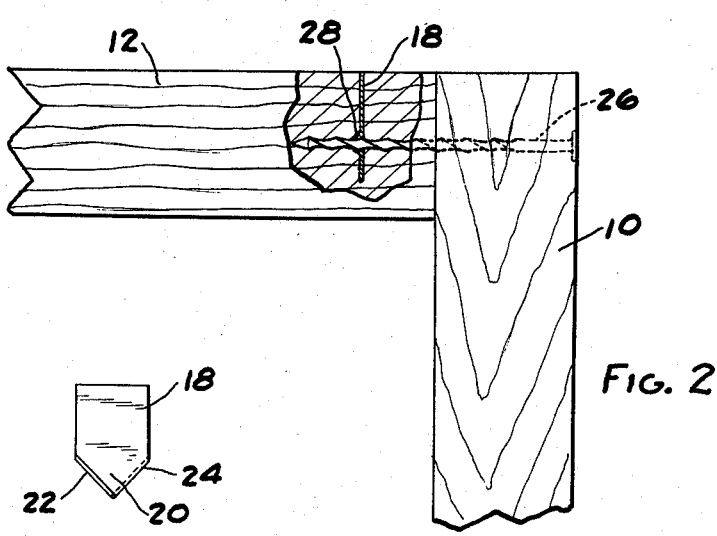
Fig. 2 is a view similar to Fig. 1 but showing the members secured together.
Figure 3:
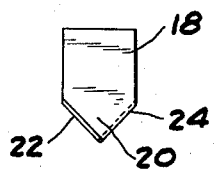
Fig. 3 is an elevational view of an anchor plate shown separately.

Shown in Fig. 1 are two members 10 and 12 which are to be secured together with surfaces 14 and 16 thereof in abutting relation. These surfaces are illustrated as being flat for convenience but could be contoured. In accordance with the present invention, an anchor plate 18 is positioned against member 12 at a distance from surface 16 as illustrated in dotted lines. Anchor plate 18 is then driven into member 12 in a direction generally parallel to but not necessarily exactly parallel to surface 16.

Anchor plate 18 is made of any suitable material such as steel, having sufficient hardness to penetrate member 12 and having sufficient thickness to provide adequate column strength to withstand hammering or like forces applied thereto in driving it home. The anchor is shown as having a pointed end 20 and tapered sharpened edges 22 and 24 to facilitate penetration of member 12 but these features may not be necessary in all instances.

After anchor 18 has been driven into member 12, surfaces 14 and 16 are abutted in proper relative positions and a fastening device 26 is positioned against member 12 in alignment with surfaces 14 and 16 and in alignment with plate 18. Device 26 may comprise either a nail, a self-threading screw, or the like. If a nail is used, it may be of a smooth type, a serrated type, or as shown in the drawings, a type having helical threads on its surface. All of these types of nails are conventional and are available commercially. For convenience, device 26 will be referred to as a nail.

Nail 26 is then driven through member 10 into member 16 and through anchor plate 18. In piercing plate 18, portions 28 thereof are upset by the nail and these portions strongly engage the surface of the nail and by spring back, tend to dig into the surface of the nail. Consequently, any force tending to withdraw the nail also tends to cause upset portions 28 to dig into its surface, thereby strongly resisting withdrawal of the nail. In this regard, it is important that at least a portion of the nail be driven entirely beyond upset portions 28 to insure purchase thereof against the nail surface. The joint thus formed is very strong and will resist loosening of the joint between members 10 and 12.

It is to be noted that no drilling or perforating of anchor plate 18 is necessary and no piercing or drilling of members 10 or 12 is necessary prior to the time when the nail 26 is driven home. The nail itself does the piercing of both members 10 and 12 and anchor plate 18. Thus the method of this invention is extremely simple and rapid.

It has been found that relatively soft members such as Celotex or other pressed fiber boards can be effectively secured together according to this invention. The invention is also well adapted to use in manufacture of articles such as show-case cabinets or shipping boxes or crates wherein relatively thin wood or like panels are used. Show cabinets and shipping boxes or crates are subject to being moved around and handled with a consequent tendency to loosen their joints. The present invention provides a joint which strongly resists this tendency toward loosening. At the same time, the invention enables relatively small diameter screws, nails or the like to be used in assembling thin wood panels, thereby diminishing or eliminating the danger of splitting the wood as frequently occurs when larger screws or nails must be used.

I claim:

1. A method of securing together two members of relatively soft material such as wood or the like comprising, driving an imperforate metal plate into one of said members in a direction transverse to the direction of the holding force which will ultimately hold said members together while leaving the regions of said one member adjacent said plate unpierced, aligning the other of said members with said one member, aligning a longitudinally advanceable self-threading fastening device with said members and said plate, applying longitudinal force to said device so that it, in a single operation, pierces and threads through said other member, pierces and threads into said one member and pierces said imperforate plate to form a hole therein, continuing to apply said longitudinal force so that said device distorts the metal defining said hole outwardly and threads through the hole thus enlarged, and continuing to apply said longitudinal force until a portion of said device penetrates entirely beyond the distorted metal so that said distorted metal by spring-back engages said device with a force restraining retrograde threading movement of said device, said restraining force being sufficient so that said device and plate of themselves securely fasten said members together.

2. A method of securing together two members of relatively soft material such as wood or the like comprising, providing on said members surfaces which are to be interengaged when said members are secured together, driving an imperforate metal plate into one of said members in a direction generally paralleling said surface thereof while leaving said one member unpierced between said plate and surface, then after said metal plate has been driven into said one member, bringing said surfaces into interengaged relation, aligning a longitudinally advanceable fastening device with an unpierced portion of the other of said members and with said interengaged surfaces and said plate, applying longitudinal force to said device so that it, in a single operation, pierces through said other member, pierces into said one member and pierces said imperforate plate to form a hole therein, continuing to apply said longitudinal force so that said device distorts the metal defining said hole outwardly and passes through the hole thus enlarged, and continuing to apply said longitudinal force until a portion of said device penetrates entirely beyond the distorted metal so that said distorted metal, by spring-back, engages said device with a force restraining retrograde movement of said device, said restraining force being sufficient so that said device and plate of themselves securely fasten said members together.

References Cited in the file of this patent

UNITED STATES PATENTS

| 977,342 | Stroh | Nov. 29, 1910 |

FOREIGN PATENTS

| 79,213 | Germany | June 23, 1894 |
| 112,081 | Germany | Aug. 7, 1900 |
| 422,143 | France | Mar. 13, 1911 |
| 521,725 | Belgium | Aug. 14, 1953 |